US012625255B2

(12) United States Patent
Ma et al.

(10) Patent No.: US 12,625,255 B2
(45) Date of Patent: May 12, 2026

(54) COMPLEX SCENE DEFORMATION MONITORING AND CLASSIFYING METHOD BASED ON InSAR AND DEEP LEARNING SELF-ATTENTION MODEL

(71) Applicant: Peifeng Ma, Shenzhen (CN)

(72) Inventors: Peifeng Ma, Shenzhen (CN); Zherong Wu, Shenzhen (CN); Yi Zheng, Shenzhen (CN)

(73) Assignee: Ma Peifeng, Shenzhen (CN)

( * ) Notice: Subject to any disclaimer, the term of this patent is extended or adjusted under 35 U.S.C. 154(b) by 287 days.

(21) Appl. No.: 18/420,836

(22) Filed: Jan. 24, 2024

(65) Prior Publication Data

US 2025/0164633 A1     May 22, 2025

(30) Foreign Application Priority Data

Nov. 21, 2023    (CN) .......................... 202311557560.2

(51) Int. Cl.
G01S 13/90          (2006.01)
(52) U.S. Cl.
CPC ................................ G01S 13/9023 (2013.01)
(58) Field of Classification Search
CPC .................................................. G01S 13/9023
See application file for complete search history.

(56) References Cited

U.S. PATENT DOCUMENTS

| | | | |
|---|---|---|---|
| 12,270,897 B1 * | 4/2025 | Zuo ........................ | G01S 7/4021 |
| 2013/0083967 A1 * | 4/2013 | Vorobiov ................ | G06T 7/593 |
| | | | 382/103 |
| 2020/0394780 A1 * | 12/2020 | Sowter ................ | G01S 13/9027 |
| 2023/0236311 A1 * | 7/2023 | Jiang ................... | G01S 13/9023 |
| | | | 342/25 F |

\* cited by examiner

*Primary Examiner* — William Kelleher
*Assistant Examiner* — Juliana Cross
(74) *Attorney, Agent, or Firm* — WPAT, PC

(57)          ABSTRACT

Disclosed is a complex scene deformation monitoring and classifying method based on interferometric synthetic aperture radar (InSAR) and a deep learning self-attention model, including: generating a deformation interferogram by using an InSAR extraction technology combining persistent scatterer (PS) points and distributed scatter (DS) points and relying on a shuttle radar topography mission digital elevation model (SRTM DEM) image; constructing a Delaunay triangulation network and an annular zone, obtaining a time series deformation data of PS points and DS points through adaptive arc densification and omni-directional point expansion, and extracting settlement points on a bridge; decomposing a time series by an SAR-self-attention model, decomposing InSAR time series data into a trend component and a seasonal component, and interpreting and analyzing deformation of the sea-crossing bridge; and describing time series dynamics and a seasonal pattern by comparing a curve fitting method with a seasonal and trend decomposition method.

9 Claims, 3 Drawing Sheets

Perform co-registration between a Sentinel-1 SAR image and a Cosmo-SkyMed image by using an improved InSAR extraction technology of PS points and DS points and relying on assistance of a SRTM DEM image, and generate an interferogram ～S1

Construct a Delaunay triangulation network and an annular zone on the basis of the generated interferogram, obtain deformation data of a time series of all PS points and DS points by means of adaptive arc densification and omni-directional point expansion, and extract settlement points on a bridge ～S2

Synthesize an InSAR time series sample means of the time series deformation data, decompose a time series by using an SAR-self-attention model, so as to decompose InSAR time series data into a trend component and a seasonal component, and accurately interpret and analyze deformation of a sea-crossing bridge ～S3

Analyze the generated deformation time series, describe time dynamics and a seasonal pattern after the time series is decomposed by comparing a curve fitting method with a seasonal and trend decomposition method using LOESS ～S4

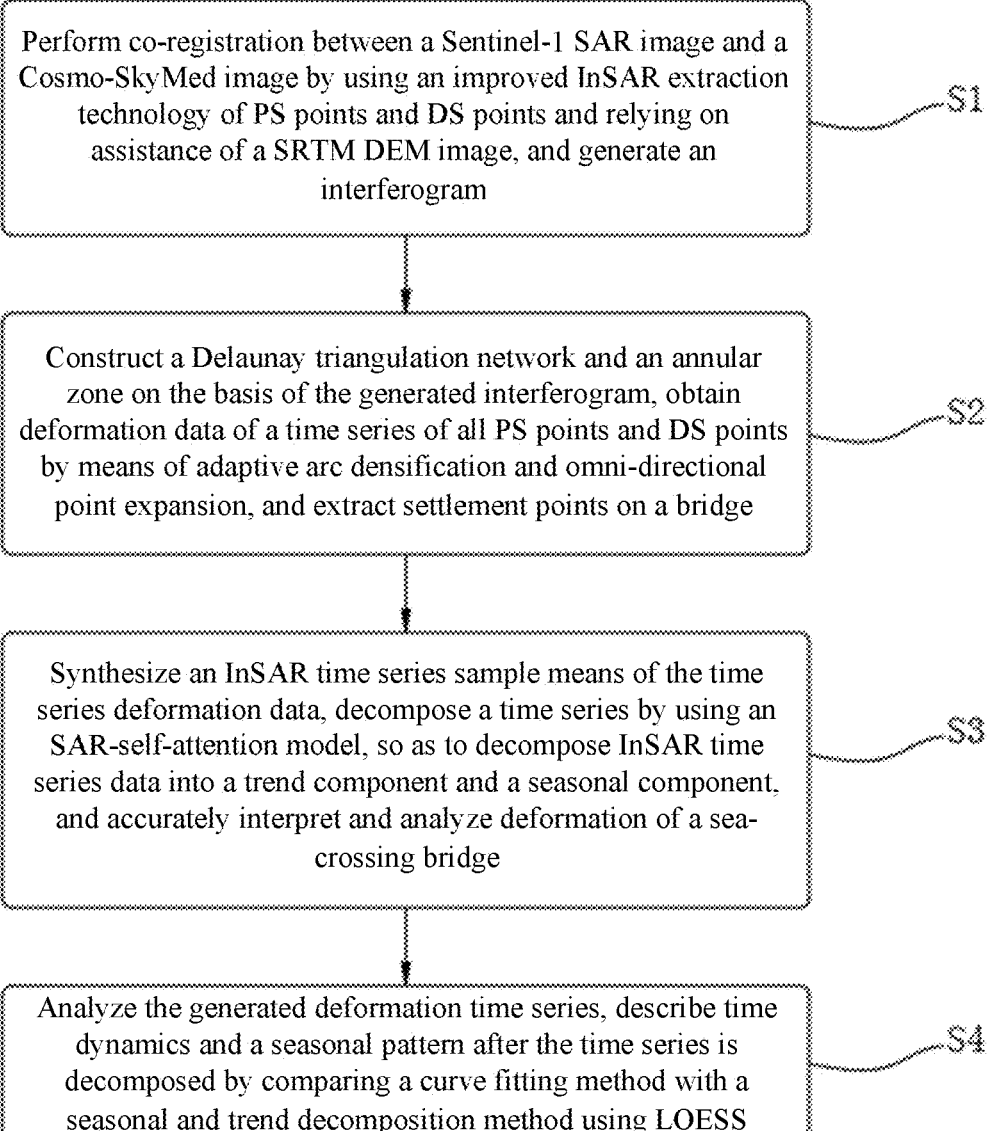

Perform co-registration between a Sentinel-1 SAR image and a Cosmo-SkyMed image by using an improved InSAR extraction technology of PS points and DS points and relying on assistance of a SRTM DEM image, and generate an interferogram ~S1

Construct a Delaunay triangulation network and an annular zone on the basis of the generated interferogram, obtain deformation data of a time series of all PS points and DS points by means of adaptive arc densification and omni-directional point expansion, and extract settlement points on a bridge ~S2

Synthesize an InSAR time series sample means of the time series deformation data, decompose a time series by using an SAR-self-attention model, so as to decompose InSAR time series data into a trend component and a seasonal component, and accurately interpret and analyze deformation of a sea-crossing bridge ~S3

Analyze the generated deformation time series, describe time dynamics and a seasonal pattern after the time series is decomposed by comparing a curve fitting method with a seasonal and trend decomposition method using LOESS ~S4

FIG. 1

COMPLEX SCENE DEFORMATION MONITORING AND CLASSIFYING METHOD BASED ON InSAR AND DEEP LEARNING SELF-ATTENTION MODEL

TECHNICAL FIELD

The present disclosure relates to the technical field of deformation monitoring, and particularly relates to a complex scene deformation monitoring and classifying method based on interferometric synthetic aperture radar (InSAR) and a deep learning self-attention model.

BACKGROUND

Various types of deformation monitoring in complex scenes have always been a top priority, and sea-crossing bridges are a typical complex scene. As an important transportation link connecting land and islands, the sea-crossing bridges have become increasingly important in modern societies, and they have a critical function in enhancing transportation networks, promoting trade growth, and facilitating regional integration. However, these bridges are susceptible to deformation in complex coastal environments, including extreme weather events, tidal loading, and natural damage. The unusual movement and potential failure of the sea-crossing bridges have serious impacts on public safety and property in coastal cities.

In recent years, the time-series interferometric synthetic aperture radar (TSInSAR) technology has significantly improved the temporal and spatial resolution and data processing accuracy in monitoring the stability of various types of bridges. However, with the emergence of ultra-long sea-crossing bridges with a wide range of structural compositions in complex geological, meteorological, and oceanic environments, conventional time-series deformation fitting typically relies on linear (or linear and seasonal) models, which are not applicable in complex situations, and thus there is an urgent need to efficiently analyze ground deformations of ultra-large sea-crossing bridges.

SUMMARY

Based on the above objectives, the present disclosure provides a complex scene deformation monitoring and classifying method based on interferometric synthetic aperture radar (InSAR) and a deep learning self-attention model.

The complex scene deformation monitoring and classifying method based on InSAR and the deep learning self-attention includes:

S1: performing a co-registration between a Sentinel-1 SAR image and a Cosmo-SkyMed image by using an improved InSAR extraction technology combining PS points and DS points and relying on an assistance of a shuttle radar topography mission digital elevation model (SRTM DEM) image, and generating an interferogram;

S2: constructing a Delaunay triangulation network and an annular zone on a basis of the generated interferogram, obtaining time series deformation data of all PS points and DS points through adaptive arc densification and omni-directional point expansion, and extracting settlement points on a bridge;

S3: synthesizing an InSAR time series sample through the time series deformation data, decomposing a time series by using an SAR-self-attention model, so as to decompose InSAR time series data into a trend component and a seasonal component, and accurately interpreting and analyzing deformation of a sea-crossing bridge; and S4: analyzing the generated deformation time series, describing time dynamics and a seasonal pattern after the time series is decomposed by comparing a curve fitting method with a seasonal and trend decomposition method using locally weighted scatterplot smoothing (LOESS).

Further, S1 specifically includes:

performing a registration on Sentinel 1 with multiple baselines with the aid of the SRTM DEM image through an enhanced spectral diversity method, as for the Cosmo-SkyMed image, performing a co-registration based on a coherence coefficient method, removing a monitored topographical phase from an original interferogram, to generate differential interferograms, and improving a phase quality of each interferogram through a coherence weighted phase linking method.

Further, the S2 specifically includes:

S21: constructing a bridge geometry-based network, specifically, determining a PS candidate point based on an amplitude dispersion index and a spatial consistency, connecting the PS candidate point by constructing the Delaunay triangulation network, differentiating an interference phase by connecting adjacent points, to eliminate an atmospheric phase screen, and then estimating a difference parameter of the Delaunay triangulation network by M-estimator;

S22: enhancing a bridge beam connectivity, specifically, constructing a ring bridge geometric network based on a thermal expansion feature of a bridge beam, to guarantee a continuity of measurement points and increase a connectivity of the entire network;

S23: performing network densifying and a point expansion strategy, specifically, comparing an arc densifying method based on beam geometry with a complete dense network, improving a network quality and a computing efficiency, setting radius of two circles, performing adaptive arc densifying, and implementing full connection of a PS network; and S24: obtaining the time series deformation data, specifically, in a first-layer network, identifying PS points with stable phase information as reference points of a second-layer network, detecting other PS points and DS points by using an omni-directional point expansion strategy, connecting each candidate point to two adjacent reference PS points, to guarantee accurate parameter estimation of expansion points, and obtaining the time series deformation data of all the PS and DS points.

Further, the synthesized InSAR time series sample include a trend component, a seasonal component and a noise element, and typical deformation related to physical behaviors of the sea-crossing bridge are captured.

Further, an additive white noise component is added to the synthesized InSAR time series sample, and the noise component represents random fluctuations that are uncorrelated in time, and a data set including several synthesized InSAR time series samples is generated by combining the trend component, the seasonal component and the noise component.

Further, the trend component and the seasonal component in the S3 include an encoder module and a decoder module, and activation functions used in each decoder are different.

Further, encoder modules in the trend component and the seasonal component process the input InSAR time series data in sequence, and further include a timestamp encoding technology for solving irregular time intervals in a high-resolution InSAR dataset and missing time series data in a medium-low resolution InSAR dataset.

Further, the decoders in the trend component and the seasonal component generate a trend element and a seasonal element according to representation in the encoders, include a linear layer, perform weighted combination on encoded features, use the activation functions to capture complex patterns in the data, use another linear layer to perfect the representation, and generate a predicted trend element and seasonal element, and a trend branch uses a rectified linear unit activation function and introduces nonlinearity, to capture positive trend deformation in the InSAR time series data;

the seasonal component uses a hyperbolic tangent activation function that simulates a periodic pattern, including annual variations due to meteorological and oceanographic activity;

during training, the SAR-self-attention network uses the synthesized training sample for supervised learning, the network is optimized by minimizing a mean square error loss between a predicted trend component and seasonal component and a true value, and a total loss function is calculated as a sum of the three individual losses, including a trend loss $Loss_{trend}$, a seasonal loss $Loss_{seasonal}$ and a reconstruction loss $Loss_{reconstruction}$; and by minimizing the three individual losses simultaneously, the SAR-self-attention model network decomposes the InSAR time series data into the trend component and the seasonal component, and accurately interprets and analyzes the deformation of the sea-crossing bridge.

Further, the curve fitting method includes fitting a sinusoidal function and a quadratic function, where fitting the sinusoidal function is to capture the periodic pattern, fitting the quadratic function is to capture a general trend, and the curve fitting method further includes a residual part, to account for residual variations;

the seasonal and trend decomposition method decomposes the time series into a trend part, a seasonal part and a residual part using the LOESS technology, and performs smooth curve fitting on a local subset of the data, so as to capture long-term variations and a periodic pattern;

three indexes of velocity V_t, acceleration A_t and thermal amplitude A_s are introduced to describe the trend element and the seasonal element, and the velocity reflects a variation rate of the trend element after decomposition, representing a velocity of a trend varying over time, and is expressed as:

$$V_t = \frac{n}{N-1} \sum_{i=1}^{N-1} \left( \frac{X_{i+1}^t - X_i^t}{t_{i+1} - t_i} \right),$$

where $$X_i^t$$

represents a decomposed trend component at an i-th timestamp at $t_i$, N represents a total number of timestamps, and n represents a scaling factor of 365 or 366 for a leap year, and is used to convert the acceleration to millimeter/year;

the acceleration is another indicator quantifying a curvature or an acceleration of the trend element varying over time, representing a variation velocity of a trend variation rate, and is calculated by performing second derivative on the trend element:

$$A_t = -\frac{n^2}{N-2} \sum_{i=1}^{N-2} \left[ \frac{X_{i+2}^t - 2X_{i+1}^t + X_i^t}{(t_{i+2} - t_{i+1})(t_{i+1} - t_i)} \right];$$

and the curve fitting method further includes measuring a thermal amplitude, where the measuring a thermal amplitude is to measure a variation condition of the decomposed seasonal component relative to a temperature difference, and the thermal amplitude is calculated by dividing an amplitude of the seasonal element by a temperature variation:

$$A_s = \frac{2 \cdot \max\left(\left|X_i^s - \overline{X^s}\right|\right)}{T_s - T_w}, \, i = 1 \text{ to } N,$$

where $$X_i^s$$

represents a separated seasonal element of the ith timestamp, $\overline{X^s}$ represents a mean value of separated seasonal elements, $\overline{X^s}$ and $\overline{T_w}$ represent mean temperatures of summer and winter respectively, and N is the total number of timestamps.

The Beneficial Effects of the Present Disclosure

The present disclosure provides a SAR-self-attention model method, which may automatically decompose an InSAR time series into different deformation elements, the model is trained on the synthesized InSAR samples and then applied to monitoring the overall deformation of a sea-crossing bridge, and pays special attention to key substructure movement, and results provide technical support for constructing intelligent and modern bridge deformation analysis and early warning by big data technology.

BRIEF DESCRIPTION OF THE DRAWINGS

In order to more clearly illustrate technical solutions in the present disclosure or in the prior art, a brief introduction to the accompanying drawings required for the description of the examples or the prior art will be provided below. Obviously, the accompanying drawings in the following description are only the present disclosure, and those ordinary skill in the art would also be able to derive other drawings from these drawings without making creative efforts.

FIG. 1 is a schematic flowchart of a method according to an example of the present disclosure.

DETAILED DESCRIPTION OF THE EMBODIMENTS

In order to make the objectives, technical solutions and advantages of the present disclosure clearer, the present disclosure will be described in further detail below in conjunction with the specific examples.

Figure 2:
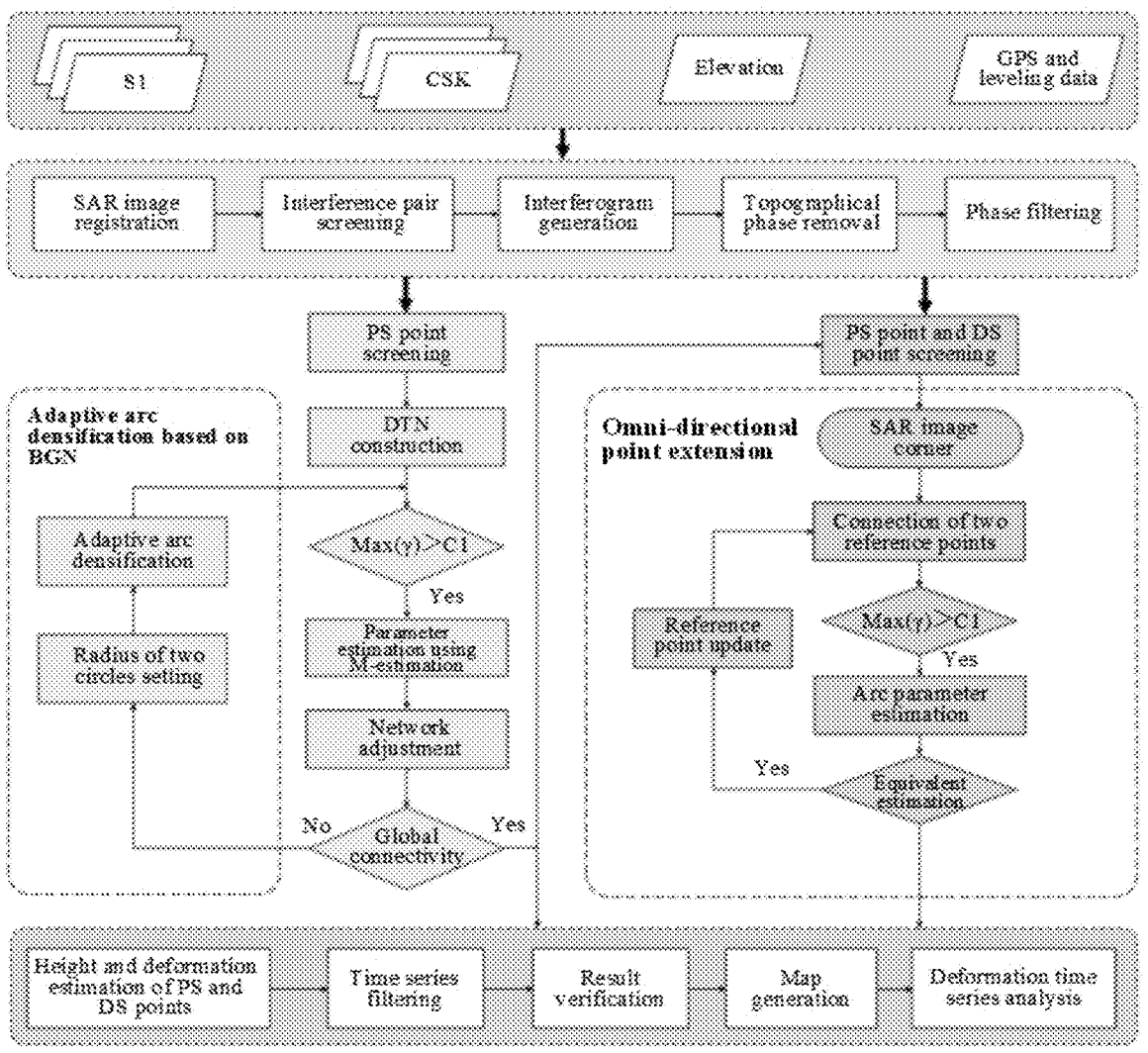
FIG. 2 is a schematic diagram of an improved interferometric synthetic aperture radar (InSAR) extraction technique combining PS points and DS points according to an example of the present disclosure.
Figure 3:
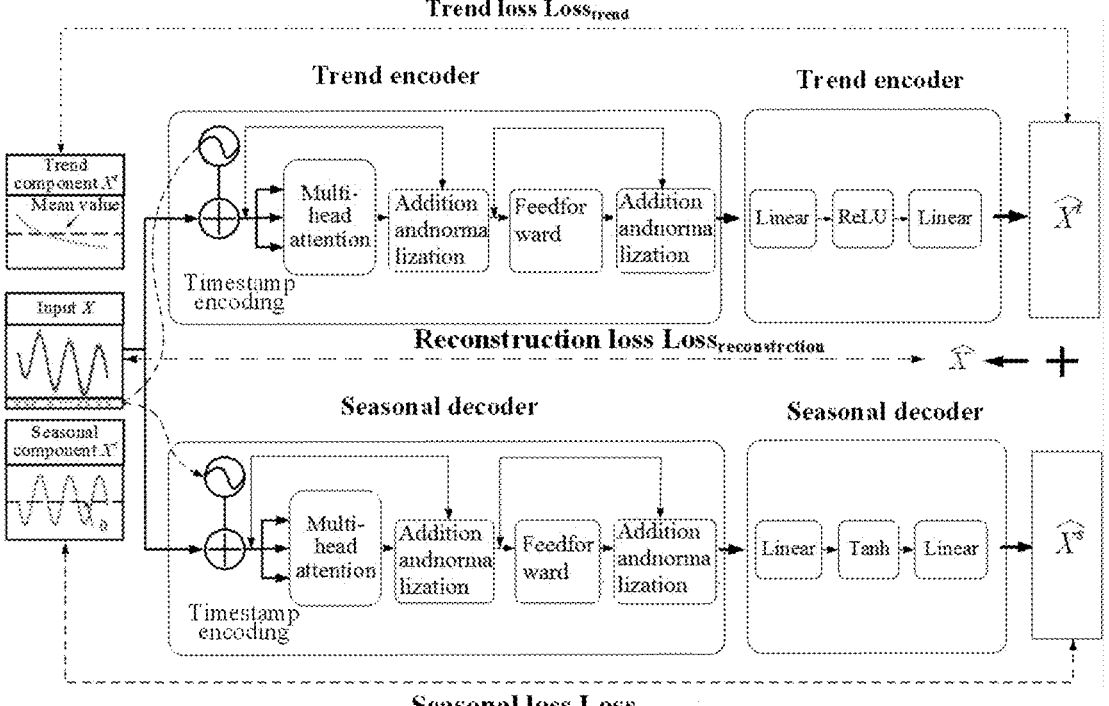
FIG. 3 is a structure diagram of a deep learning self-attention model network according to an example of the present disclosure.

As shown in FIGS. 1-3, a complex scene deformation monitoring and classifying method based on interferometric synthetic aperture radar (InSAR) and a deep learning self-attention includes:

First step: an improved InSAR extraction technology combining PS points and DS points is used to extract settlement points on a bridge.

A Sentinel-1SAR image and a Cosmo-SkyMed (CSK) image are subject to a co-registration with the aid of shuttle radar topography mission digital elevation model (SRTM DEM) image, and an interferogram is generated. In order to increase a connectivity of a network, an annular zone is constructed after a Delaunay triangulation network (DTN) is constructed. A first-layer network uses a bridge geometry-based network (BGN) for adaptive arc densification, and a second-layer network performs omni-directional point expansion, such that time series deformation data of all PS points and DS points are obtained.

Second step: a time series is decomposed by an SAR-self-attention model.

A deep learning network relies on adequate and sufficient training data to achieve the best performance. But real InSAR time series data lack ground truth information for decomposing elements. To face this challenge, an InSAR time series sample is synthesized using the time series deformation data generated in the first step, a data set is put into a SAR-self-attention model for decomposing the time series, and the InSAR time series data are decomposed into a trend component and a seasonal component, such that deformation of a sea-crossing bridge is accurately interpreted and analyzed.

Third step: the deformation time series is analyzed.

In order to evaluate performance of the SAR-self attention model, time dynamics and a seasonal pattern are described after the time series is decomposed by selecting a curve fitting method and using a Seasonal-Trend decomposition procedure based on locally weighted scatterplot smoothing (LOESS) (STL).

Synthesized InSAR Time Series Data:

A deep learning network relies on adequate and sufficient training data to achieve the best performance. But real InSAR time series data lack ground truth information for decomposing elements. To face this challenge, the synthesized InSAR time series sample is generated and includes a trend element, a seasonal element, and a noise element, and typical deformation related to physical behaviors of a super sea-crossing bridge are captured.

The trend component represents a gradual variation of surface deformation over time and indicates a long-term geodynamic process. Four different trend component patterns are considered, which may be expressed as:

$$X^t(i) = \begin{cases} A_l \cdot i, & \text{linear stable trend} \\ -A_d \cdot \ln(i+i_d)+S_d, & \text{deceleration trend} \\ A_a \cdot \ln(i_a-i)+S_a, & \text{acceleration trend} \\ 0, & \text{no change} \end{cases}$$

where i represents a specific timestamp, $A_l$ represents a deformation rate of a linear trend, $V_d$ and $A_d$ control a deformation rate and acceleration of deceleration and acceleration trends respectively, $i_d$ represents an observation start timestamp of the deceleration trend, $i_a$ represents a deformation failure timestamp of the acceleration trend, $S_d$ and $S_a$ are constants, and it is guaranteed that the trend is zero when i=0.

The seasonal component is simulated by a sinusoidal function, represents a regularity and periodic variation of deformation, and has a calculation formula as follows:

$$X^s(i) = A_s \cdot \sin(2\pi f i + \theta),$$

where $A_s$ controls seasonal amplitude, f represents frequency (frequency set to $\frac{1}{365}$ for tropical years), and $\theta$ controls phase shift.

To simulate atmospheric noise commonly found in real InSAR data, additive white noise is added to the synthesized time series. The noise component represents random fluctuations that are uncorrelated in time. By combining the trend component, the seasonal component and the noise components, a dataset of 120,000 synthesized InSAR time series samples is generated, and each trend type (linear stabilization, deceleration, acceleration) has 40,000 samples. In order to guarantee a thorough evaluation of the deep learning model, the dataset is randomly divided into 80% of a training set and 20% of a test set.

Specific Steps:

1. An improved InSAR extraction technology combining PS points and DS points is used to extract settlement points on a bridge.

Firstly, a two-layer network integrating PS and DS interferometry techniques is used to extract the settlement points on the bridge, and a deformation map of the sea-crossing bridge is drawn. Due to different dynamic features of the components of the sea-crossing bridge, in case that it is not handled properly, serious decorrelation problem may be caused. In order to enhance a connectivity of PS and DS candidates, a bridge geometry-based network (BGN) is proposed by constructing a ring structure.

An enhanced spectral diversity (ESD) method is used to perform a registration on a Sentinel 1 (S1) with multiple baselines with the aid of SRTM DEM images, as for the Cosmo-SkyMed (CSK) image, a co-registration is performed using a typical coherence coefficient method, a monitored topographical phase is removed from an original interferogram, to generate differential interferograms, and a phase quality of each interferogram is improved through a coherence weighted phase linking method.

Next, a first-layer network is constructed, PS candidate points (PSs) are determined through an amplitude dispersion index of 0.3 and spatial consistency of 0.6, and a Delaunay triangulation network (DTN) is constructed to connect the PS candidate points. By connecting adjacent points, an interference phase between two points on an arc may be differentiated to eliminate an atmospheric phase screen (APS). The differential parameters of each arc of DTN are estimated by using an M-estimator.

In order to increase the connectivity of the network, a ring BGN network is constructed after the DTN is constructed.

The method is conducive to connection of PSCs with similar features. Compared with a complete dense network, the arc densifying method based on beam geometry improves the network quality and a computing efficiency, and also reduces the number of arcs. Through the network (BGN), the radius of two circles may be set and the adaptive arc densification may be performed. Finally, the effect of full network connection of PS may be achieved. In the study, considering a length of a bridge unit, a radius of a smaller circle and a radius of a larger circle of a densifying ring zone are set to be 300 meters and 900 meters respectively.

In the first-layer network, PSs with stable phase information with temporal coherence greater than 0.72 are identified as reference points of a second-layer network. Other PSs and DSs are detected by using an omni-directional point expansion strategy. DS candidate points are selected according to the number of pixels having statistical uniformity greater than 25. Each candidate point is connected to two adjacent reference PSs, to guarantee accurate parameter estimation of expansion points. The time series deformation data of all the PS and DS points, that is, all settlement points on the bridge, are obtained by the second-layer network.

2. A time series is decomposed by an SAR-self-attention model.

An SAR-self-attention method is proposed. The method uses a self-attention model, and has two branches to decompose InSAR time series data into a trend element and a seasonal component (FIG. 2). The method may efficiently capture the time dependence and variation features of input data. The trend branch and the seasonal branch both consist of an encoder module and a decoder module, the only difference between the trend branch and the seasonal branch is the activation function used in respective decoders.

In each branch, the encoder module processes the input InSAR time series data sequentially. In order to solve irregular time intervals in a high-resolution InSAR dataset (such as CSK data), a timestamp encoding solution is proposed. By encoding the relative timestamps of observation data, the network may identify time intervals and capture time dependence effectively. Moreover, the time-stamp encoding technique may also solve data missing caused by sensor failure and atmospheric conditions, where data missing is common in low-resolution InSAR datasets such as S1 data. Encoded timestamps are conducive to identification of the presence of observed data at specific time steps or not, thereby enhancing robustness and flexibility of an SAR converter. Timestamp encoding is added to input embedding and is calculated as follows:

$$TE_{(ts,2i)} = \sin\left(\frac{ts}{10000^{\frac{2i}{d_{model}}}}\right)$$
$$TE_{(ts,2i+1)} = \cos\left(\frac{ts}{10000^{\frac{2i}{d_{model}}}}\right);$$

where ts represents a timestamp, i represents a dimension of timestamp encoding, and parameter $d_{model}$ represents a dimension of input embedding.

After timestamp encoding, the encoder applies a multi-head attention mechanism. The mechanism allows the network to focus on different parts of the series and capture long-range dependencies in the time series data. Mathematically, the multi-head attention mechanism may be expressed as:

$$\text{Attention}(Q, K, V) = \text{softmax}\left(\frac{QK^T}{\sqrt{d_K}}\right)V;$$

where

Q, K, and V are a query matrix, a key matrix, and a value matrix respectively, and $d_K$ represents a dimension of the key matrix. After the attention mechanism, an "add&norm" operation combines attention output features with attention input features, and then normalizes a resulting representation. A feedforward layer performs nonlinear transformation on the encoded representation to extract higher-level features. Finally, another addition and normalization operation is applied to combine the output of the feedforward layer with an intermediate representation of the attention mechanism.

The decoder in each branch generates a trend element and a seasonal element according to a representation learned from the encoder, specifically, including a linear layer, performs weighted combination on encoded features, uses the activation functions to capture complex patterns in the data, uses another linear layer to further perfect the representation, and generates the predicted trend element and seasonal element. A trend branch uses a rectified linear unit (ReLU) activation function and introduces nonlinearity, to capture positive trend deformation in the InSAR time series data. In another aspect, a seasonal branch uses a hyperbolic tangent (tanh) activation function, which is suitable for simulating periodic patterns such as annual variations caused by meteorological and oceanic activity.

In a training process, the SAR-self-attention network uses the synthesized training sample for supervised learning, the network is optimized by minimizing a mean square error (MSE) loss between a predicted trend component and sea-sonal component and a true value, and a total loss function is calculated as a sum of the three individual losses, includ-ing a trend loss $\text{Loss}_{trend}$, a seasonal loss $\text{Loss}_{seasonal}$ and a reconstruction loss $\text{Loss}_{reconstruction}$.

$$\text{Loss}_{total} = \text{Loss}_{trend} + \text{Loss}_{seasonal} + \text{Loss}_{reconstruction}$$

$\text{Loss}_{trend}$ measures a difference between a predicted trend component $\text{Loss}_{trend}$ and a ground truth trend component $X^t$.

$$\text{Loss}_{trend} = \frac{1}{N}\sum_{i=1}^{N}\left(\hat{X}_i^t - X_i^t\right)^2$$

Similarly, seasonal loss is calculated as a difference between a predicted seasonal element $\overline{X^s}$ and a ground truth seasonal element $X^s$.

$$\text{Loss}_{seasonal} = \frac{1}{N}\sum_{i=1}^{N}\left(\hat{X}_i^s - X_i^s\right)^2$$

In order to accurately reconstruct an original InSAR time series, a reconstruction loss is also calculated, which is defined as an MSE between a reconstructed time series $\hat{X}$ and the original InSAR time series X.

$$\text{Loss}_{reconstruction} = \frac{1}{N}\sum_{i=1}^{N}\left(\hat{X}_i - X_i\right)^2$$

By minimizing the three losses simultaneously, the SAR-self-attention model network decomposes the InSAR time series data into the trend component and the seasonal component effectively, and then accurately interprets and analyzes the deformation of the sea-crossing bridge.

3. The deformation time series is analyzed.

To evaluate the performance of the proposed SAR converter, two other widely used benchmark methods are selected for comparison: a curve fitting method and a seasonal-trend decomposition procedure based on LOESS (STL). The curve fitting method includes fitting a sinusoidal function to capture a periodic pattern and fitting a quadratic function to capture an overall trend, and further includes a residual part to account for residual variations. The STL method uses the LOESS technique to decompose the time series into a trend part, a season part, and a residual part, and performs smooth curve fitting on local subsets of data, to effectively capture the long-term variations and the periodic patterns.

To better describe the trend element and the seasonal element, three indexes of velocity V_t, acceleration A_t and thermal amplitude A_s are introduced, and the velocity reflects a variation rate of the trend element after decomposition, representing a velocity of a trend varying over time, and is expressed through a mathematical method as:

$$V_t = \frac{n}{N-1} \sum_{i=1}^{N-1} \left( \frac{X_{i+1}^t - X_i^t}{t_{i+1} - t_i} \right);$$

where $$X_i^t$$

represents a decomposed trend component at an ith timestamp at $t_i$, N represents a total number of timestamps, and n represents a scaling factor of 365 or 366 for a leap year, and is used to convert the acceleration to millimeter/year.

The acceleration is another indicator quantifying a curvature or an acceleration of the trend element varying over time, representing a variation velocity of a trend variation rate, and is calculated by performing second derivative on the trend element:

$$A_t = -\frac{n^2}{N-2} \sum_{i=1}^{N-2} \left[ \frac{X_{i+2}^t - 2X_{i+1}^t + X_i^t}{(t_{i+2} - t_{i+1})(t_{i+1} - t_i)} \right];$$

where a signal has the same meaning as the trend velocity formula mentioned above, and the unit of trend acceleration is millimeter/year$^2$.

In another aspect, a thermal amplitude measures a variation condition of the decomposed seasonal element relative to a temperature difference, which is conducive to understanding of a relationship between surface deformation patterns and temperature variations, and the thermal amplitude is calculated by dividing an amplitude of the seasonal element by a temperature variation:

$$A_s = \frac{2 \cdot \max(|X_i^s - \overline{X^s}|)}{T_s - T_w}, i = 1 \text{ to } N;$$

where $$X_i^s$$

represents a separated seasonal element of the ith timestamp, $\overline{X^s}$ represents a mean value of separated seasonal elements, $\overline{X^s}$ and $\overline{T_w}$ represent mean temperatures of summer and winter respectively, and N is the total number of timestamps. The three indicators provide valuable quantitative indicators for understanding temporal dynamics and seasonal patterns present in the InSAR time series data.

It should be understood by those of ordinary skill in the art that the discussion of any of the above example is illustrative only and is not intended to imply that the scope of the present disclosure is limited to these instances. Under the idea of the present disclosure, the technical features in the above example or from different examples may also be combined, steps may be implemented in any order, and there are many other variations in different aspects of the present disclosure, which have not been provided in detail for the sake of brevity.

The present disclosure is intended to cover all such alternatives, modifications and variations falling within a broad scope of the claims. Therefore, any omission, modifications, equivalent substitutions, improvements, etc. made within the spirit and principle of the present disclosure should be included within the protection scope of the present disclosure.

What is claimed is:

1. A complex scene deformation monitoring and classifying method based on interferometric synthetic aperture radar (InSAR) and a deep learning self-attention model, comprising:

S1: performing a co-registration between a first SAR image from a first satellite constellation and a second SAR image from a second satellite constellation by using an improved InSAR extraction technology of PS points and DS points and relying on an assistance of a shuttle radar topography mission digital elevation model (SRTM DEM) image, and generating an interferogram;

S2: constructing a Delaunay triangulation network and an annular zone on a basis of the generated interferogram, obtaining time series deformation data of all PS points and DS points through adaptive arc densification and omni-directional point expansion, and extracting settlement points on a bridge;

S3: synthesizing an InSAR time series sample through the time series deformation data, decomposing a time series by using an SAR-self-attention model, so as to decompose InSAR time series data into a trend component and a seasonal component, and accurately interpreting and analyzing deformation of a sea-crossing bridge; and S4: analyzing the generated deformation time series, describing time dynamics and a seasonal pattern after the time series is decomposed by comparing a curve fitting method with a seasonal and trend decomposition method using locally weighted scatterplot smoothing (LOESS).

2. The complex scene deformation monitoring and classifying method based on InSAR and the deep learning self-attention model according to claim 1, wherein the S1 specifically comprises: performing a registration on the first SAR image with multiple baselines with the assistance of the SRTM DEM image through an enhanced spectral diversity method, as for the second SAR image, performing a co-registration based on a coherence coefficient method, removing a monitored topographical phase from an original interferogram to generate differential interferograms, and improving a phase quality of each differential interferogram through a coherence weighted phase linking method.

3. The complex scene deformation monitoring and classifying method based on InSAR and the deep learning self-attention model according to claim 2, wherein the S2 specifically comprises:

S21: constructing a bridge geometry-based network, specifically, determining a PS candidate point based on an amplitude dispersion index and a spatial consistency, connecting the PS candidate point by constructing the Delaunay triangulation network, differentiating an interference phase by connecting adjacent points, to eliminate an atmospheric phase screen, and then estimating a difference parameter of the Delaunay triangulation network by M-estimator;

S22: enhancing a bridge beam connectivity, specifically, constructing a ring bridge geometric network based on a thermal expansion feature of a bridge beam, to guarantee a continuity of measurement points and increase a connectivity of an entire network;

S23: performing network densifying and a point expansion strategy, specifically, comparing an arc densifying method based on beam geometry with a complete dense network, improving a network quality and a computing efficiency, setting radius of two circles, performing adaptive arc densifying, and implementing full connection of a PS network; and S24: obtaining the time series deformation data, specifically, in a first-layer network, identifying PS points with stable phase information as reference points of a second-layer network, detecting other PS points and DS points by using an omni-directional point expansion strategy, connecting each candidate point to two adjacent reference PS points to guarantee accurate parameter estimation of expansion points, and obtaining the time series deformation data of all the PS and DS points.

4. The complex scene deformation monitoring and classifying method based on InSAR and the deep learning self-attention model according to claim 3, wherein the synthesized InSAR time series sample comprise a trend component, a seasonal component and a noise element, and typical deformation related to physical behaviors of the sea-crossing bridge are captured.

5. The complex scene deformation monitoring and classifying method based on InSAR and the deep learning self-attention model according to claim 4, wherein an additive white noise component is added to the synthesized InSAR time series sample, and the noise component represents random fluctuations uncorrelated in time, and a data set comprising several synthesized InSAR time series samples is generated by combining the trend component, the seasonal component and the noise component.

6. The complex scene deformation monitoring and classifying method based on InSAR and the deep learning self-attention model according to claim 5, wherein the trend component and the seasonal component in the S3 comprise an encoder module and a decoder module, and activation functions used in each decoder are different.

7. The complex scene deformation monitoring and classifying method based on InSAR and the deep learning self-attention model according to claim 6, wherein encoder modules in the trend component and the seasonal component process input InSAR time series data in sequence, and further comprise a timestamp encoding technology for solving irregular time intervals in a high-resolution InSAR dataset and missing time series data in a medium-low resolution InSAR dataset.

8. The complex scene deformation monitoring and classifying method based on InSAR and the deep learning self-attention model according to claim 7, wherein the decoders in the trend component and the seasonal component generate a trend element and a seasonal element according to representation in the encoders, comprise a linear layer, perform a weighted combination on encoded features, use the activation functions to capture complex patterns in the data, use another linear layer to perfect the representation, and generate a predicted trend element and seasonal element, and a trend branch uses a rectified linear unit activation function and introduces nonlinearity to capture positive trend deformation in the InSAR time series data;

the seasonal component uses a hyperbolic tangent activation function, and the hyperbolic tangent activation function simulates a periodic pattern, comprising annual variations due to meteorological and oceanographic activities;

during training, the SAR-self-attention network uses a synthesized training sample for supervised learning, the network is optimized by minimizing a mean square error loss between a predicted trend component and seasonal component and a true value, and a total loss function is calculated as a sum of the three individual losses, comprising a trend loss $\text{Loss}_{trend}$, a seasonal loss $\text{Loss}_{seasonal}$ and a reconstruction loss $\text{Loss}_{reconstruction}$; and by minimizing the three individual losses simultaneously, the SAR-self-attention model network decomposes the InSAR time series data into the trend component and the seasonal component, and accurately interprets and analyzes the deformation of the sea-crossing bridge.

9. The complex scene deformation monitoring and classifying method based on InSAR and the deep learning self-attention model according to claim 8, wherein the curve fitting method comprises fitting a sinusoidal function and a quadratic function, wherein fitting the sinusoidal function is to capture the periodic pattern, fitting the quadratic function is to capture a general trend, and the curve fitting method further comprises a residual part, to account for residual variations;

the seasonal and trend decomposition method decomposes the time series into a trend part, a seasonal part and a residual part using the LOESS technology, and performs smooth curve fitting on a local subset of the data, so as to capture long-term variations and a periodic pattern;

three indexes of velocity $V_t$, acceleration $A_t$ and thermal amplitude $A_s$ are introduced to describe the trend element and the seasonal element, and the velocity reflects a variation rate of the trend element after decomposition, representing a velocity of a trend varying over time, and is expressed as:

$$V_t = \frac{n}{N-1}\sum_{i=1}^{N-1}\left(\frac{X_{i+1}^t - X_i^t}{t_{i+1} - t_i}\right);$$

wherein $$X_i^t$$

represents a decomposed trend component at an i-th time-stamp at $t_i$, N represents a total number of timestamps, and n represents a scaling factor of 365 or 366 for a leap year, and is used to convert the acceleration to millimeter/year;

the acceleration is another indicator quantifying a curvature or an acceleration of the trend element varying over time, representing a variation velocity of a trend variation rate, and is calculated by performing second derivative on the trend element:

$$A_t = -\frac{n^2}{N-2}\sum_{i=1}^{N-2}\left[\frac{X_{i+2}^t - 2X_{i+1}^t + X_i^t}{(t_{i+2} - t_{i+1})(t_{i+1} - t_i)}\right];$$

and the curve fitting method further comprises measuring a thermal amplitude, wherein the measuring a thermal amplitude is to measure a variation condition of the decomposed seasonal component relative to a temperature difference, and the thermal amplitude is calculated by dividing an amplitude of the seasonal element by a temperature variation:

$$A_s = \frac{2 \cdot \max\left(\left|X_i^s - \overline{X^s}\right|\right)}{\overline{T_s} - \overline{T_w}}, i = 1 \text{ to } N;$$

wherein $$X_i^s$$

represents a separated seasonal element of the i-th time-stamp, $\overline{X^s}$ represents a mean value of separated seasonal elements, $\overline{T_s}$ and $\overline{T_w}$ represent mean temperatures of summer and winter respectively, and N is the total number of timestamps.

\* \* \* \* \*